W. R. DAILY.
GARDEN PLOW.
APPLICATION FILED AUG. 6, 1918.

1,286,545.

Patented Dec. 3, 1918.

Witnesses

Inventor
W. R. Daily
By D. Swift & Co.
Attorneys

UNITED STATES PATENT OFFICE.

WILLIAM R. DAILY, OF LOGAN, KANSAS.

GARDEN-PLOW.

1,286,545.  Specification of Letters Patent.  Patented Dec. 3, 1918.

Application filed August 6, 1918.  Serial No. 248,561.

*To all whom it may concern:*

Be it known that I, WILLIAM R. DAILY, a citizen of the United States, residing at Logan, in the county of Phillips, State of Kansas, have invented a new and useful Garden-Plow; and I do hereby declare the following to be a full, clear, and exact description of the invention, such as will enable others skilled in the art to which it appertains to make and use the same.

This invention relates to an improved hand cultivator, and one of the objects of the invention is to simplify and render more practical the general construction of such devices, and to provide a device of this kind which may be manufactured at a small cost and sold at a reasonable profit.

A further object of the invention is to provide a hand wheel cultivator having the hand frame pivoted upon the axle of the wheels, in combination with plow beams likewise mounted upon the axle, and a U-shaped brace connected between the plow beams, two of which are extended laterally and upwardly and connected to the plow frame, to insure a rigid structure.

In practical fields the details of construction may necessitate alterations falling within the scope of what is claimed.

The invention comprises further features and combination of parts as hereinafter set forth, shown in the drawings:

In the drawing:—

Figure 1:
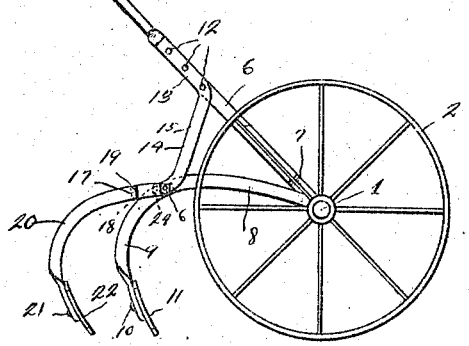
Figure 1 is a view in side elevation of the improved cultivator constructed in accordance with the invention.
Figure 2:
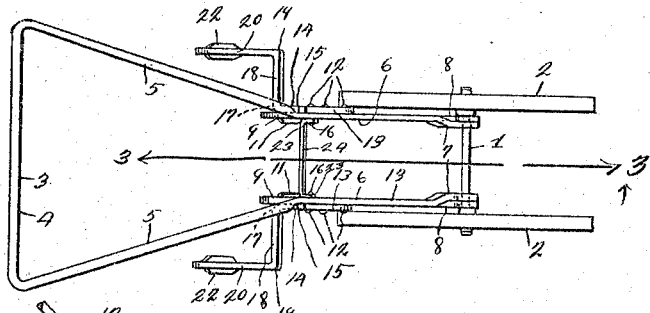
Fig. 2 is a plan view of the same.
Figure 3:
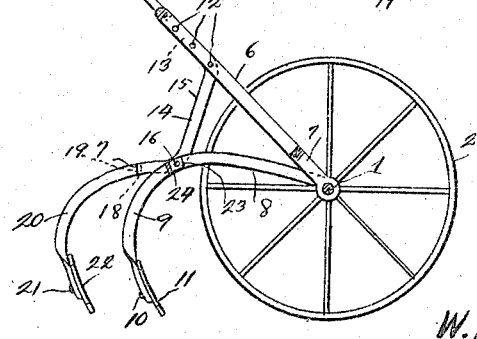
Fig. 3 is a sectional view on line 3—3 of Fig. 2.

Referring more especially to the drawings 1 designates an axle, on the ends of which supporting wheels 2 are mounted. A handle member 3 is provided for the cultivator. As shown clearly in Fig. 2 of the drawing the handle member comprises a transverse bar 4, and projecting forwardly downwardly and converging toward each other for part their length are the arms 5, and their portions 6 are in parallelism with each other and have their lower ends offset inwardly toward each other as shown at 7 and are pivoted upon the axle 1, as shown clearly in Fig. 2. Also mounted upon the axle 1 are plow beams 8, which extend rearwardly and upwardly then downwardly as shown at 9 and attached as at 10 to their lower ends are cultivating blades or plows 11. Secured at 12 to the upper parts of the parallel portions 6 on their outer faces are the end portions 13 of the plow beams 14, the portions 15 of which incline slightly rearwardly and downwardly and are secured by the bolts 16 to the plow beams 8. In fact the beams 14 are secured to the outer faces of the beams 8, and beyond the bolts 16 the beams 14 extend slightly rearwardly and are bent at 17, thereby providing the laterally and oppositely extending portions 18, which are bent at 19, and therebeyond the beams 14 extend rearwardly and curve downwardly as shown at 20, the lower extremities of which have secured thereto as at 21 cultivating or plow blades 22. From the foregoing and the illustrations, it is obvious that the cultivating or plow blades are arranged so as to turn the soil in four different rows in parallelism with each other, the cultivating blades 11 being disposed inwardly and in advance of the blades 22. Also secured by the bolts 16, but to the inner faces of the plow beams 8 are the lateral ends 23 of the U-shaped transverse brace bar 24, thereby bracing the beams 8 as well as the beams 14 relative to each other.

The invention having been set forth what is claimed as new and useful is:—

In a hand cultivator, the combination with a handle member having forwardly and downwardly extending arms, of an axle journaled in the lower ends of said arms and provided with supporting wheels, of plow beams pivoted on said axle and extending rearwardly and downwardly and having cultivating blades at their lower ends, a second pair of plow beams having their upper portions secured to the outer faces of said arms, and extending downwardly and inclined slightly rearwardly and connected to the first plow beams and having portions beyond said connections extending laterally in opposite directions, then curved rearwardly and downwardly and having cultivating blades at their lower ends, owing to said last named means extending rearwardly beyond and laterally to opposite sides of the first beams, said second blades are positioned laterally and to the rear of the first cultivating blades, and a U-shaped transverse bar connected to the inner faces of the first plow beams, and means connecting the ends of the U-shaped bar and the plow beams of either side securely together.

In testimony whereof I have signed my name to this specification in the presence of two subscribing witnesses.

WILLIAM R. DAILY.

Witnesses:
W. M. DUNNING,
GEO. BOWMAN.

Copies of this patent may be obtained for five cents each, by addressing the "Commissioner of Patents, Washington, D. C."